(12) United States Patent
Ray et al.

(10) Patent No.: US 9,548,873 B2
(45) Date of Patent: Jan. 17, 2017

(54) VIRTUAL EXTENSIBLE LAN TUNNEL KEEPALIVES

(71) Applicant: BROCADE COMMUNICATIONS SYSTEMS, INC., San Jose, CA (US)

(72) Inventors: Amit K. Ray, Bangalore (IN); Phanidhar Koganti, Fremont, CA (US); Shunjia Yu, San Jose, CA (US); Vardarajan Venkatesh, Santa Clara, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 12 days.

(21) Appl. No.: 14/618,941

(22) Filed: Feb. 10, 2015

(65) Prior Publication Data
US 2015/0229724 A1 Aug. 13, 2015

Related U.S. Application Data

(60) Provisional application No. 61/937,950, filed on Feb. 10, 2014, provisional application No. 62/037,519, filed on Aug. 14, 2014.

(51) Int. Cl.
H04L 29/08 (2006.01)
H04L 29/06 (2006.01)
H04L 12/46 (2006.01)

(52) U.S. Cl.
CPC ....... H04L 12/4641 (2013.01); H04L 12/4633 (2013.01)

(58) Field of Classification Search
None
See application file for complete search history.

(56) References Cited

U.S. PATENT DOCUMENTS 829,529 A 8/1906 Keathley
5,390,173 A 2/1995 Spinney
(Continued)

FOREIGN PATENT DOCUMENTS

CN 102801599 A 11/2012
EP 0579567 5/1993
(Continued)

OTHER PUBLICATIONS

Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
(Continued)

*Primary Examiner* — Charles C Jiang
*Assistant Examiner* — George Atkins, Jr.
(74) *Attorney, Agent, or Firm* — Shun Yao; Park, Vaughan, Fleming & Dowler LLP

(57) ABSTRACT

One embodiment of the present invention provides a switch that is a member of a fabric switch. The switch includes a keepalive response module that identifies a keepalive response packet that does not correspond to any keepalive packet previously transmitted by the switch. The switch also includes a switch identifier extraction module that extracts a switch identifier from a payload of the keepalive response packet, where the switch identifier corresponds to another member switch in the fabric switch. The switch further includes a forwarding module that constructs a packet that includes the payload and is destined to the other member switch.

24 Claims, 12 Drawing Sheets

(56) References Cited

U.S. PATENT DOCUMENTS

| | | |
|---|---|---|
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B1 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 * | 9/2010 | Triantafillis ........ H04L 12/4633 370/216 |
| 7,808,992 B2 | 10/2010 | Homchaudhuri |
| 7,836,332 B2 | 11/2010 | Hara |
| 7,843,906 B1 | 11/2010 | Chidambaram |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,465,774 B2 | 6/2013 | Breder |
| 8,467,375 B2 | 6/2013 | Blair |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 8,706,905 B1 | 4/2014 | McGlaughlin |
| 8,724,456 B1 | 5/2014 | Hong |
| 8,798,045 B1 | 8/2014 | Aybay |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 9,350,680 B2 | 5/2016 | Thayalan |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0091795 A1 | 7/2002 | Yip |
| 2003/0041085 A1 | 2/2003 | Sato |
| 2003/0093567 A1 | 5/2003 | Lolayekar |
| 2003/0097464 A1 | 5/2003 | Martinez |
| 2003/0123393 A1 | 7/2003 | Feuerstraeter |
| 2003/0147385 A1 | 8/2003 | Montalvo |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 * | 1/2004 | Gram ..................... H04L 12/24 370/229 |
| 2004/0003094 A1 | 1/2004 | See |
| 2004/0008868 A1 | 1/2004 | Bornowski |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |

(56) References Cited

U.S. PATENT DOCUMENTS

| | | |
|---|---|---|
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0243673 A1 | 12/2004 | Goyal |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0098589 A1 | 5/2006 | Kreeger |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl et al. |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0211712 A1 | 9/2007 | Fitch |
| 2007/0220059 A1 | 9/2007 | Lu |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0057918 A1 | 3/2008 | Abrant |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty et al. |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida Ruah |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0042869 A1 | 2/2010 | Szabo |
| 2010/0046471 A1 | 2/2010 | Hattori |
| 2010/0054260 A1 | 3/2010 | Pandey |

(56) References Cited

U.S. PATENT DOCUMENTS

| | | |
|---|---|---|
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0254703 A1 | 10/2010 | Kirkpatrick |
| 2010/0257263 A1 | 10/2010 | Casado |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0055274 A1 | 3/2011 | Scales et al. |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1* | 12/2011 | Vobbilisetty ........ H04L 12/4625 370/392 |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva et al. |
| 2012/0033668 A1 | 2/2012 | Humphries |
| 2012/0033669 A1 | 2/2012 | Mohandas |
| 2012/0033672 A1 | 2/2012 | Page |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0177039 A1 | 7/2012 | Berman |
| 2012/0210416 A1 | 8/2012 | Mihelich |
| 2012/0221636 A1 | 8/2012 | Surtani |
| 2012/0239918 A1 | 9/2012 | Huang |
| 2012/0243539 A1 | 9/2012 | Keesara |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai |
| 2012/0327937 A1 | 12/2012 | Melman et al. |
| 2013/0003535 A1 | 1/2013 | Sarwar |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0066947 A1 | 3/2013 | Ahmad |
| 2013/0067466 A1 | 3/2013 | Combs |

(56) References Cited

U.S. PATENT DOCUMENTS

| | | |
|---|---|---|
| 2013/0070762 A1 | 3/2013 | Adams |
| 2013/0114595 A1 | 5/2013 | Mack-Crane |
| 2013/0124707 A1 | 5/2013 | Ananthapadmanabha |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0148546 A1 | 6/2013 | Eisenhauer |
| 2013/0156425 A1 | 6/2013 | Kirkpatrick |
| 2013/0194914 A1 | 8/2013 | Agarwal |
| 2013/0219473 A1 | 8/2013 | Schaefer |
| 2013/0223449 A1 | 8/2013 | Koganti |
| 2013/0250951 A1 | 9/2013 | Koganti |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315586 A1 | 11/2013 | Kipp |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0044126 A1 | 2/2014 | Sabhanatarajan |
| 2014/0050223 A1* | 2/2014 | Foo ............... H04L 47/2441 370/400 |
| 2014/0056298 A1 | 2/2014 | Vobbilisetty |
| 2014/0064056 A1 | 3/2014 | Sakata |
| 2014/0105034 A1 | 4/2014 | Sun |
| 2014/0157251 A1 | 6/2014 | Hocker |
| 2014/0298091 A1 | 10/2014 | Carlen |
| 2015/0010007 A1 | 1/2015 | Matsuhira |
| 2015/0030031 A1 | 1/2015 | Zhou |
| 2015/0127618 A1 | 5/2015 | Alberti |
| 2015/0143369 A1 | 5/2015 | Zheng |
| 2015/0195093 A1 | 7/2015 | Mahadevan et al. |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |

FOREIGN PATENT DOCUMENTS

| | | |
|---|---|---|
| EP | 0579567 A2 | 1/1994 |
| EP | 0993156 A2 | 12/2000 |
| EP | 1398920 A2 | 3/2004 |
| EP | 1916807 A2 | 4/2008 |
| EP | 2001167 A1 | 10/2008 |
| WO | 2008056838 | 5/2008 |
| WO | 2009042919 | 4/2009 |
| WO | 2010111142 A1 | 9/2010 |
| WO | 2014031781 | 2/2014 |

OTHER PUBLICATIONS

Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.

* cited by examiner

VIRTUAL EXTENSIBLE LAN TUNNEL KEEPALIVES

RELATED APPLICATIONS

This application claims the benefit of:

U.S. Provisional Application No. 61/937,950, titled "Virtual Extensible LAN Tunnel Keepalives," by inventors Amit Kumar Ray, Phanidhar Koganti, Shunjia Yu, and Vardarajan Venkatesh, filed 10 Feb. 2014; and U.S. Provisional Application No. 62/037,519, titled "Virtual Extensible LAN Tunnel Keepalives," by inventors Amit Kumar Ray, Phanidhar Koganti, Shunjia Yu, and Vardarajan Venkatesh, filed 14 Aug. 2014, the disclosures of which are incorporated by reference herein.

The present disclosure is related to:

U.S. patent application Ser. No. 13/087,239, titled "Virtual Cluster Switching," by inventors Suresh Vobbilisetty and Dilip Chatwani, filed 14 Apr. 2011 (hereinafter U.S. patent application Ser. No. 13/087,239);

U.S. patent application Ser. No. 13/092,724, titled "Fabric Formation for Virtual Cluster Switching," by inventors Shiv Haris and Phanidhar Koganti, filed 22 Apr. 2011 (hereinafter U.S. patent application Ser. No. 13/092,724"); and U.S. Pat. No. 8,665,886, titled "Redundant Host Connection in a Routed Network," by inventors Somesh Gupta, Anoop Ghanwani, Phanidhar Koganti, and Shunjia Yu, issued 4 Mar. 2014 (hereinafter "U.S. Pat. No. 8,665,886"), the disclosures of which are incorporated by reference herein.

BACKGROUND

Field

The present disclosure relates to network management. More specifically, the present disclosure relates to a method and system for monitoring the health of a virtual extensible local area network (LAN), or VXLAN, tunnel based on a keepalive mechanism.

Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as service insertion and provisioning, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

As Internet traffic is becoming more diverse, virtual computing in a network is becoming progressively more important as a value proposition for network architects. For example, virtual extensible local area network (VXLAN) is a network virtualization technology which facilitates an overlay encapsulation protocol, e.g., by providing a layer-3 encapsulation of a layer-2 frame through a VXLAN tunnel. However, because VXLAN tunnels are stateless, a source VXLAN tunnel endpoint (VTEP) typically does not maintain information related to the availability of a destination VTEP. If the destination VTEP is unreachable, the source VTEP may remain unaware and may not be able to bring the tunnel down. This can result in inefficient path utilization. Thus, while overlay tunneling brings many desirable features to a network, some issues remain unsolved in monitoring the health of a VXLAN tunnel.

SUMMARY

One embodiment of the present invention provides a switch that is a member of a fabric switch. The switch includes a keepalive response module that identifies a keepalive response packet that does not correspond to any keepalive packet previously transmitted by the switch. The switch also includes a switch identifier extraction module that extracts a switch identifier from a payload of the keepalive response packet, where the switch identifier corresponds to another member switch in the fabric switch. The switch further includes a forwarding module that constructs a packet that includes the payload and is destined to the other member switch.

In a variation on this embodiment, the first protocol is based on a virtual extensible local area network (VXLAN).

In a further variation, the forwarding module encapsulates the payload based on a second protocol, determines an output port for the encapsulated payload based on the extracted switch identifier, and transmits the encapsulated payload via the determined output port.

In a further variation, the switch and the other member switch are each a virtual routing Bridge (RBridge) that belongs to the fabric switch. The switch identifier for an RBridge is an RBridge identifier associated with a respective switch. The second protocol is Transparent Interconnection of Lots of Links (TRILL).

In a further variation on this embodiment, the switch includes a fabric switch management module that determines a same reserved address for the switch and any member switch in the fabric switch.

In a further variation, the keepalive response packet includes a header and the payload. The header includes a source address corresponding to a switch identifier of a remote switch and a destination address corresponding to a reserved address. The payload includes a source address corresponding to the reserved address, a destination address corresponding to a switch identifier of the switch, and information relating to a tunnel between the switch and the remote switch.

In a further variation, the header further includes a network identifier that indicates a keepalive message and is set to one of: a reserved value; a value of 0; a value configured by a user; and a value that is provisioned between the switch and the remote switch.

In a further variation, the source address included in the header is a media access control (MAC) address that includes the corresponding switch identifier in an encoded format, and the destination address included in the payload is a MAC address that includes the corresponding switch identifier in an encoded format.

BRIEF DESCRIPTION OF THE FIGURES

In the figures, like reference numerals refer to the same figure elements.

DETAILED DESCRIPTION

Figure 1A:
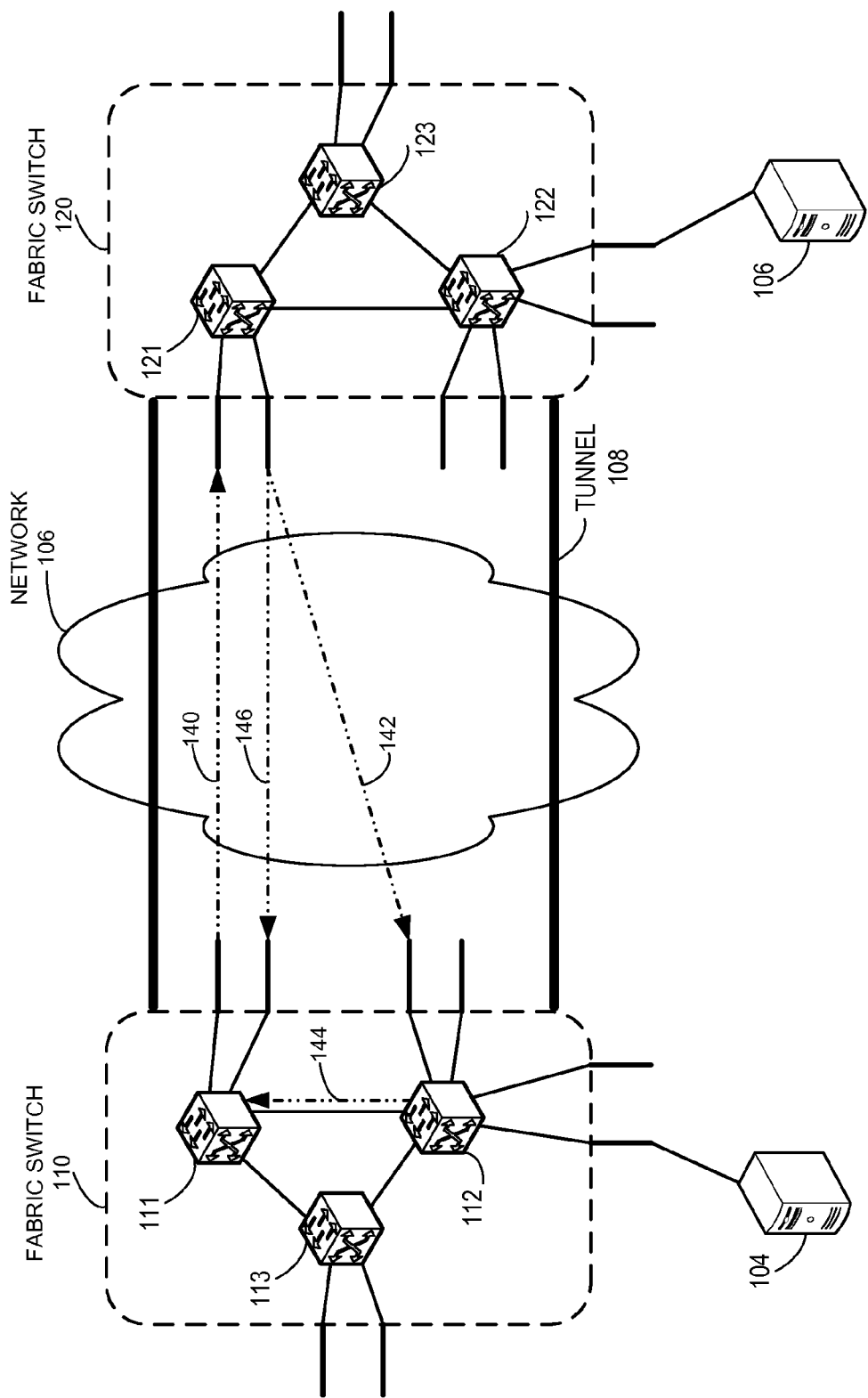
FIG. 1A illustrates an exemplary network comprising a fabric switch capable of monitoring the health of a VXLAN tunnel based on keepalive packets, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of monitoring the health of a VXLAN tunnel is solved by sending keepalive packets from a source VXLAN tunnel endpoint (VTEP) to a destination VTEP and modifying the state of the VXLAN tunnel based on received keepalive response packets. VXLAN tunnels are typically stateless. Hence, a source VTEP may not maintain state information regarding the availability of a destination VTEP. If the destination VTEP is not reachable, the source VTEP may not be aware of the unavailability, and hence, may not bring down the tunnel. This can lead to inefficient path utilization. One solution is to use Internet Control Message Protocol (ICMP) messages or the Packet to Internet Groper (PING) facility. However, these packets are typically blocked by intermediate routers and firewalls. If a VXLAN tunnel spans a wide area network (WAN) (e.g., across an IP network), these packets may get dropped. As a result, a source VTEP may bring down a tunnel even when the destination VTEP is reachable. Another solution is to use a standard VXLAN keepalive packet. However, if one VTEP supports the keepalive mechanism but the other does not, this can lead to interoperability issues. Furthermore, the source VTEP can be a fabric switch, which is a large-scale logical switch that includes a number of physical member switches. A member switch that sends a VXLAN keepalive packet may not be the same member switch that receives a corresponding keepalive response.

To solve this problem, embodiments of the present invention provide a system that allows a fabric switch, via an originating member switch as the source VTEP, to periodically create and send keepalive packets where the keepalive response packet is included (e.g., encapsulated) in the keepalive packet. This keepalive response packet is destined to the source VTEP. The destination VTEP receives and processes (e.g., decapsulates) the keepalive packet as a standard VXLAN frame. The destination VTEP determines that the keepalive response packet is destined to the source VTEP and sends the keepalive response packet back to the fabric switch. Because any member switch in the fabric switch can receive the keepalive response packet, the receiving member switch performs intra-fabric forwarding as needed to ensure that the keepalive response packet is received by the originating member switch. If the originating member switch does not receive the keepalive response packet, the originating member switch determines that the destination VTEP is not reachable and acts accordingly (e.g., sets the VXLAN tunnel state to down).

Specifically, the originating member switch of the fabric switch creates a keepalive packet that comprises an outer VXLAN header, an inner VXLAN header, and a payload. The payload includes the VXLAN tunnel information and a switch identifier of the originating member switch. The inner VXLAN header and the payload constitute the keepalive response packet. The originating member switch sends the keepalive packet to the destination VTEP, which receives the keepalive packet, decapsulates the outer VXLAN header, and inspects the inner VXLAN header. The destination VTEP can be a switch, a fabric switch, or any layer-3 or layer-3 device capable of processing a VXLAN data frame. Based on the destination addresses included in the inner VXLAN header, the destination VTEP sends the keepalive response packet (comprised of the inner VXLAN header and the payload) back to the fabric switch. Because the keepalive packet is constructed to include the keepalive response packet inside (e.g., the inner VXLAN header and the payload), the destination VTEP can process the keepalive packet like a standard VXLAN data frame and perform a standard VXLAN decapsulation. Thus, the destination VTEP does not need to support any specific VXLAN keepalive mechanisms.

When the fabric switch receives the keepalive response packet from the destination VTEP, a member switch other than the originating member switch may receive the keepalive response packet. The receiving member switch then determines whether it is the originating switch. If not, the receiving member switch forwards the keepalive response packet to the originating member switch. When the originating member switch receives the keepalive response packet, it tracks the received keepalive response based on a previously initiated timer and a drop counter. For example, upon sending the keepalive packet, the originating member switch can initiate a timer with a predetermined expiration time. If the timer expires before a corresponding keepalive response packet is received, the system can increment a drop counter that has a predetermined threshold. If the drop counter exceeds the threshold, the system can set the tunnel to a down state. If a keepalive response packet is received before the expiration of the timer, the system can reset the drop counter and, if the tunnel is in a down state, set the tunnel to an up state.

In some embodiments, the source VTEP does not belong to a fabric switch and is simply a standalone tunnel endpoint. In such a non-fabric scenario, the keepalive packet comprises an outer VXLAN header and an inner VXLAN header, and may not contain a payload with tunnel information. Instead, the keepalive mechanism relies on a virtual network identifier (VNI) in the VXLAN headers to indicate that the packet is a keepalive response packet for a VXLAN tunnel.

In some embodiments, the fabric switch is an Ethernet fabric switch in which any number of switches coupled in an arbitrary topology may logically operate as a single switch. Any new switch may join or leave the fabric switch in "plug-and-play" mode without any manual configuration. A fabric switch appears as a single logical switch to an external device. In some further embodiments, the fabric switch is a Transparent Interconnection of Lots of Links (TRILL) network and a respective member of switch of the fabric switch is a TRILL routing bridge (RBridge). In some embodiments, the fabric switch is layer-3 (e.g., Internet Protocol or IP) network and a member switch is a layer-3 node (e.g., capable of routing based on a routing protocol).

Although the present disclosure is presented using examples based on the TRILL protocol, embodiments of the present invention are not limited to networks defined using TRILL, or a particular Open System Interconnection Reference Model (OSI reference model) layer. For example, embodiments of the present invention can also be applied to a multi-protocol label switching (MPLS) network. In this disclosure, the term "fabric switch" is used in a generic sense, and can refer to a network operating in any networking layer, sub-layer, or a combination of networking layers.

The term "end device" can refer to a device coupled to a fabric switch. An end device can be a host, a server, a conventional layer-2 switch, a layer-3 router, or any other type of device. Additionally, an end device can be coupled to other switches or hosts further away from a network. An end device can also be an aggregation point for a number of network devices to enter the network. The terms "device" and "machine" are used interchangeably.

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for any networking layer, sub-layer, or a combination of networking layers.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The term "edge port" refers to a port in a fabric switch which exchanges data frames with an external device outside of the fabric switch. The term "inter-switch port" refers to a port which couples a member switch of a fabric switch with another member switch and is used for exchanging data frames between the member switches.

The term "switch identifier" refers to a group of bits that can be used to identify a switch. If the switch is an RBridge, the switch identifier can be an "RBridge identifier." The TRILL standard uses "RBridge ID" to denote a 48-bit Intermediate-System-to-Intermediate-System (IS-IS) ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is used in a generic sense, is not limited to any bit format, and can refer to "RBridge ID," "RBridge nickname," or any other format that can identify an RBridge.

The term "fabric switch" refers to a number of interconnected physical switches which form a single, scalable logical switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally.

Network Architecture

FIG. 1A illustrates an exemplary network comprising a fabric switch capable of monitoring the health of a VXLAN tunnel based on keepalive packets, in accordance with an embodiment of the present invention. Network 100 can include a fabric switch 110, which includes member switches 111, 112, and 113, and a fabric switch 120, which includes member switches 121, 122, and 123. Member switches in fabric switch 110 use edge ports to communicate to end devices and inter-switch ports to communicate to other members switches. For example, switch 112 is coupled to an end device 104 via an edge port and to switches 111 and 113 via inter-switch ports, and switch 122 is coupled to an end device 106 via an edge port and to switches 121 and 123 via inter-switch ports. Examples of end devices 104 and 106 include, but are not limited to, a layer-2 switch, layer-3 router, top-of-the-rack switch, and physical or virtual host machine. In some embodiments, fabric switches 110 and 120 are each a TRILL network; switches 111, 112, 113, 121, 122, and 123 are RBridges; and data frames transmitted and received via inter-switch ports are encapsulated in TRILL headers. In some embodiments, fabric switches 110 and 120 are each a layer-3 (e.g., IP) network, switches 111, 112, 113, 121, 122, and 123 are layer-3 nodes, and data frames transmitted and received via inter-switch ports are encapsulated in IP headers.

Network 100 also includes a virtual tunnel 108 between fabric switch 110 and fabric switch 120 passing through a network 106. Network 106 can be a layer-3 network (e.g., an IP network). Network 106 can couple fabric switch 110 and/or 120 via a virtual link aggregation group (vLAG), as specified in U.S. Pat. No. 8,665,886, titled "Redundant Host Connection in a Routed Network," which is incorporated by reference herein. Fabric switches 110 and 120 can each act as a virtual VXLAN tunnel endpoint (VTEP) in a VXLAN-based communication. A source VTEP can monitor the health of a tunnel by sending keepalive packets to (e.g., denoted by flow 140) and receiving keepalive responses from (e.g., denoted by flows 142 and 146) a destination VTEP.

Figure 1B:
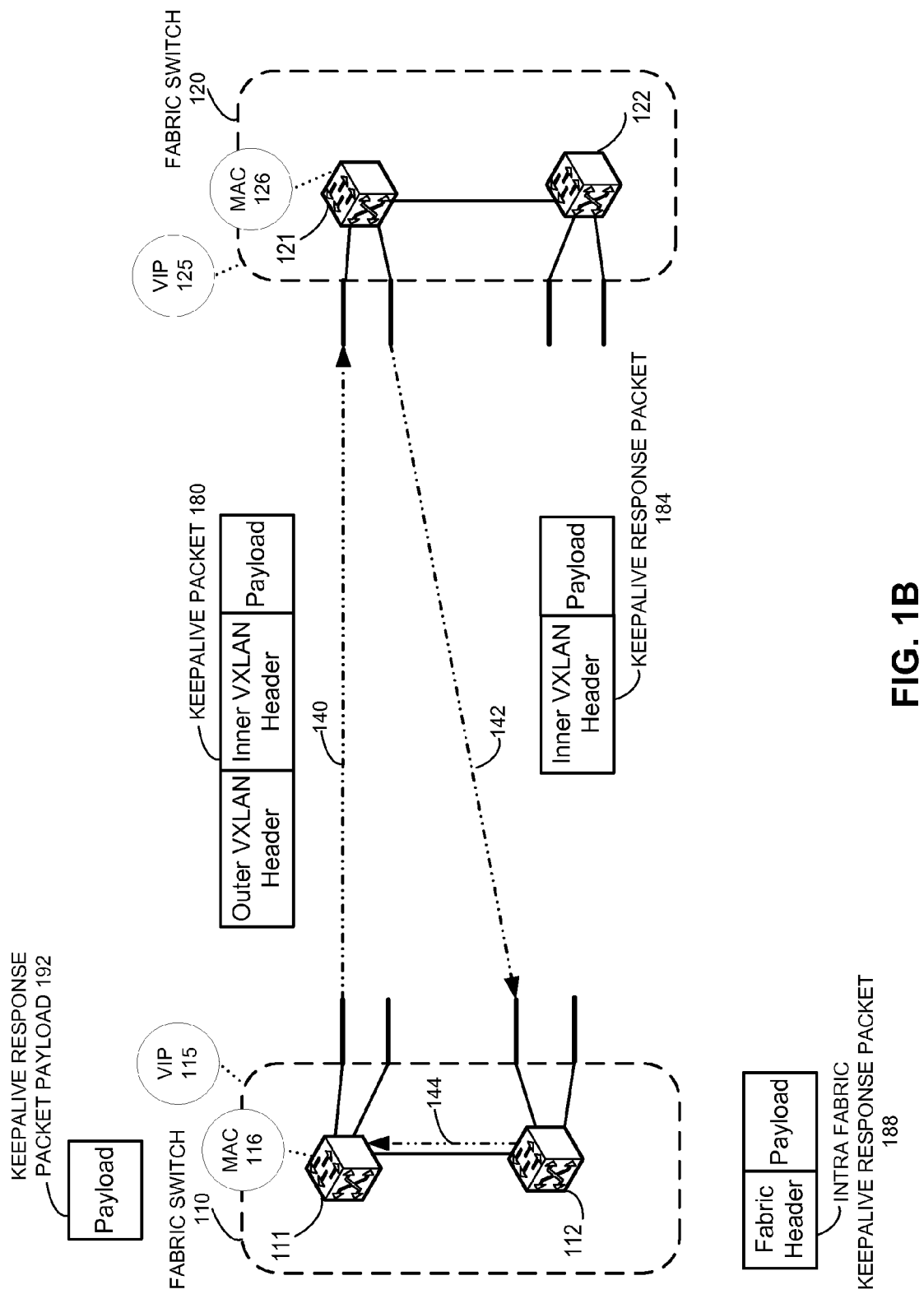
FIG. 1B illustrates an exemplary network 100 comprising a fabric switch capable of monitoring the health of a VXLAN tunnel based on keepalive packets, where the member switch that receives the keepalive response is not the originating member switch of the keepalive packet, in accordance with an embodiment of the present invention.

FIG. 1B illustrates an exemplary network comprising a fabric switch capable of monitoring the health of a VXLAN tunnel based on keepalive packets, where the member switch that receives the keepalive response is not the originating member switch that created the keepalive packet, in accordance with an embodiment of the present invention. A virtual IP address (VIP) can be associated with a respective fabric switch. For example, fabric switch 110 can have a virtual IP address 115 and fabric switch 120 can have a virtual IP address 125. In addition, a switch identifier can be associated with a respective member switch. Furthermore, a member switch can also have a MAC address. Examples of a switch identifier include, but are not limited to, an RBridge ID, an IP address, a MAC address, and a combination thereof. For example, switch 111 can have a MAC address 116 and switch 121 can have a MAC address 126. In some embodiments, the switch identifier of switch 111 is encoded in MAC address 116 and the switch identifier of switch 121 is encoded in MAC address 126. During operation, a source VTEP (e.g., member switch 111 of fabric switch 110) creates and sends a keepalive packet 180 to a destination VTEP (e.g., member switch 121 of fabric switch 120) via flow 140. Keepalive packet 180 comprises an outer header, an inner header, and a payload. The payload includes MAC address 116 of the originating member switch 111 as the destination MAC address, as described below in conjunction with FIG. 2. Switch 121, which is the destination VTEP, receives keepalive packet 180, decapsulates the outer VXLAN header, and transmits the decapsulated packet (e.g., keepalive response packet 184) back to the fabric switch via flow 142. Keepalive response packet 184 includes the inner VXLAN header and the payload.

Because member switches in fabric switch 110 can share the same virtual IP address, any member switch of fabric switch 110 can receive keepalive response packet 184. The receiving member switch (in this case, switch 112) decapsulates the inner VXLAN header and determines whether the local MAC address of switch 112 matches the destination MAC address included in the payload. If not, switch 112 encapsulates the payload with a fabric header to generate an intra-fabric keepalive response packet 188 and forward packet 188 to switch 111, which is the originating member switch, via flow 144. Examples of a fabric header include, but are not limited to, a TRILL header, an IP header, and an outer Ethernet header. Switch virtualization in a fabric switch and its associated operations, such as data frame forwarding, and fabric switch configurations in a virtual cluster fabric using a TRILL protocol are respectively described in U.S. Pat. No. 8,665,886, titled "Redundant Host Connection in a Routed Network," and U.S. patent application Ser. No. 13/087,239, titled "Virtual Cluster Switching," the disclosures of which are incorporated herein. In some embodiments, switches 111 and 112 are RBridges in a TRILL network 110 and RBridge 112 forwards intra-fabric keepalive response packet 188 to RBridge 111 by encapsulating keepalive response packet payload 192 in a TRILL header. In some embodiments, switches 111 and 112 are layer-3 nodes in a layer-3 network (e.g., an IP network) and switch 112 forwards intra-fabric keepalive response packet 188 to switch 111 by encapsulating keepalive response packet payload 192 in an IP header. Note that if the receiving member switch is the originating member switch, intra-fabric switch forwarding does not occur, as described below in relation to FIG. 1C.

Upon receiving intra-fabric keepalive response packet 188, switch 111 determines that it is the destination member switch, decapsulates the fabric header, and inspects the payload (e.g., keepalive response packet payload 192). Switch 111 then examines the destination MAC address included in the payload, determines that it matches local MAC address 116, and takes an action based on the VXLAN tunnel information included in the payload. For example, switch 111 can reset a drop counter and, if the tunnel is in a down state, sets the tunnel to an up state. The drop counter can have a predetermined threshold. Furthermore, switch 111 can initiate a timer with a predetermined expiration time when it sends keepalive packet 180. In monitoring the health of a VXLAN tunnel, switch 111 can use the drop counter and the timer in conjunction with the received keepalive response packets (e.g., keepalive response packet 184 and infra-fabric keepalive response packet 188) from switch 121 to determine whether to set VXLAN tunnel 108 to an up or a down state, as described below in relation to FIG. 3A.

Figure 1C:
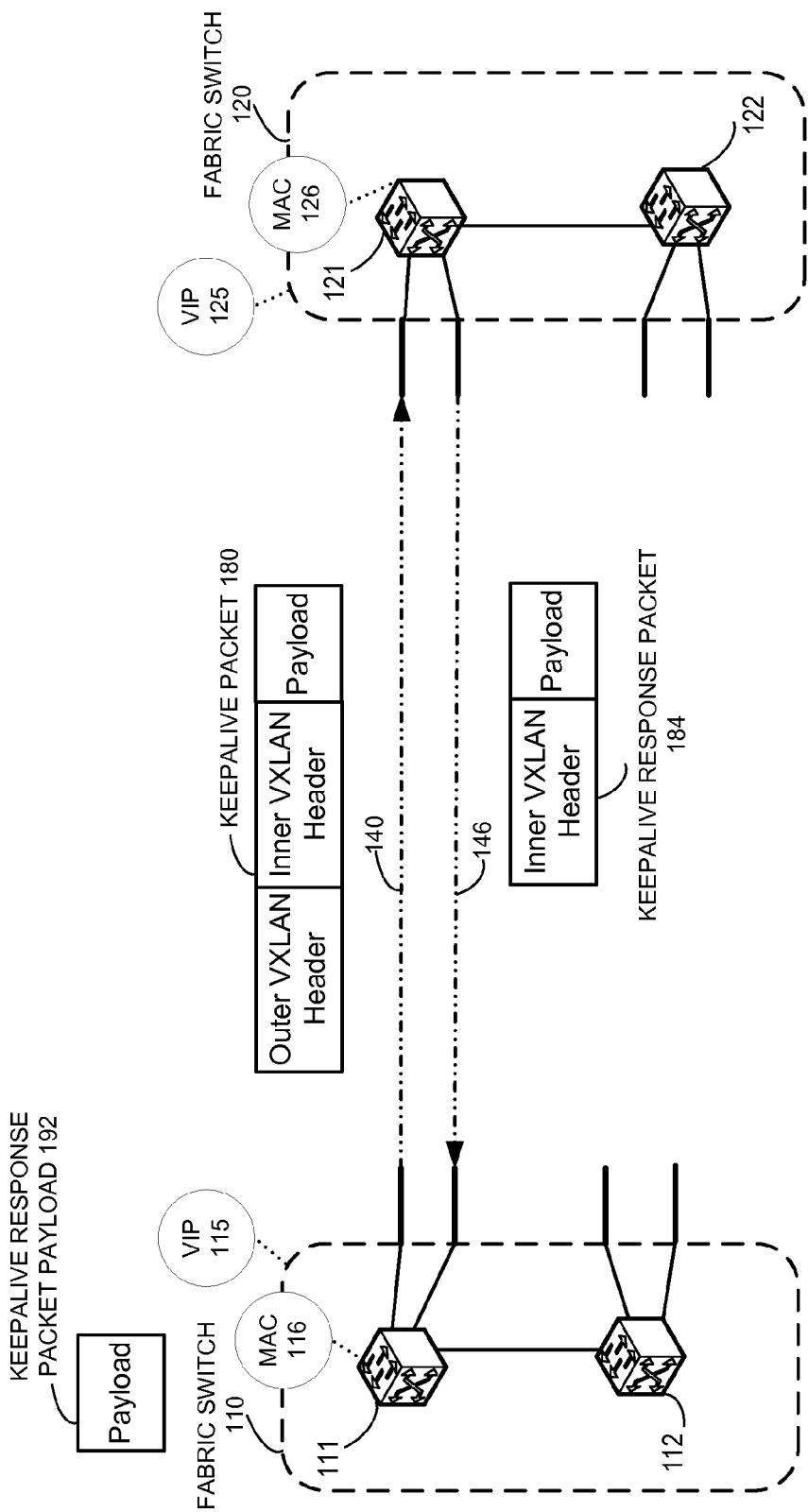
FIG. 1C illustrates an exemplary network 100 comprising a fabric switch capable of monitoring the health of a VXLAN tunnel based on keepalive packets, where the member switch that receives the keepalive response is the originating member switch of the keepalive packet, in accordance with an embodiment of the present invention.

FIG. 1C illustrates an exemplary network 100 comprising a fabric switch capable of monitoring the health of a VXLAN tunnel based on keepalive packets, where the member switch that receives the keepalive response is the originating member switch of the keepalive packet, in accordance with an embodiment of the present invention. Similar to FIG. 1B, during operation, switch 111, which is the source VTEP creates and sends a keepalive packet 180 to switch 121, which is the destination VTEP via flow 140. Keepalive packet 180 comprises an outer header, an inner header, and a payload. The payload includes a MAC address 116 of originating member switch 111 as the destination MAC address. Switch 121, which is the destination VTEP, receives keepalive packet 180, decapsulates the outer VXLAN header, and transmits the decapsulated packet (e.g., keepalive response packet 184) back to the fabric switch via flow 146. Keepalive response packet 184 includes the inner VXLAN header and the payload.

The member switch that receives keepalive response packet 184 (in this case, switch 111) decapsulates the inner VXLAN header and, based on the switch identifier included in the payload, determines whether its local MAC address 116 matches the destination MAC address included in the payload. Since they match, switch 111 uses the VXLAN tunnel information included in the payload to take an action, as described above in relation to FIG. 1B (e.g., by modifying the state of the VXLAN tunnel based on the received keepalive response packet, a drop counter, and a timer expiration).

Thus, the originating member switch of a fabric switch acts as the source VTEP, creates and sends keepalive packets, and can receive a keepalive response packet via two types of ports: 1) via an inter-switch port, an intra-fabric keepalive response packet 188, where keepalive response packet payload 192 is encapsulated with a fabric header, as described in relation to FIG. 1B; and 2) via an edge port, a keepalive response packet 184, where keepalive response payload 192 is encapsulated with an inner VXLAN header, as described in relation to FIG. 1C.

Exemplary Format of a Keepalive Packet

Figure 2:
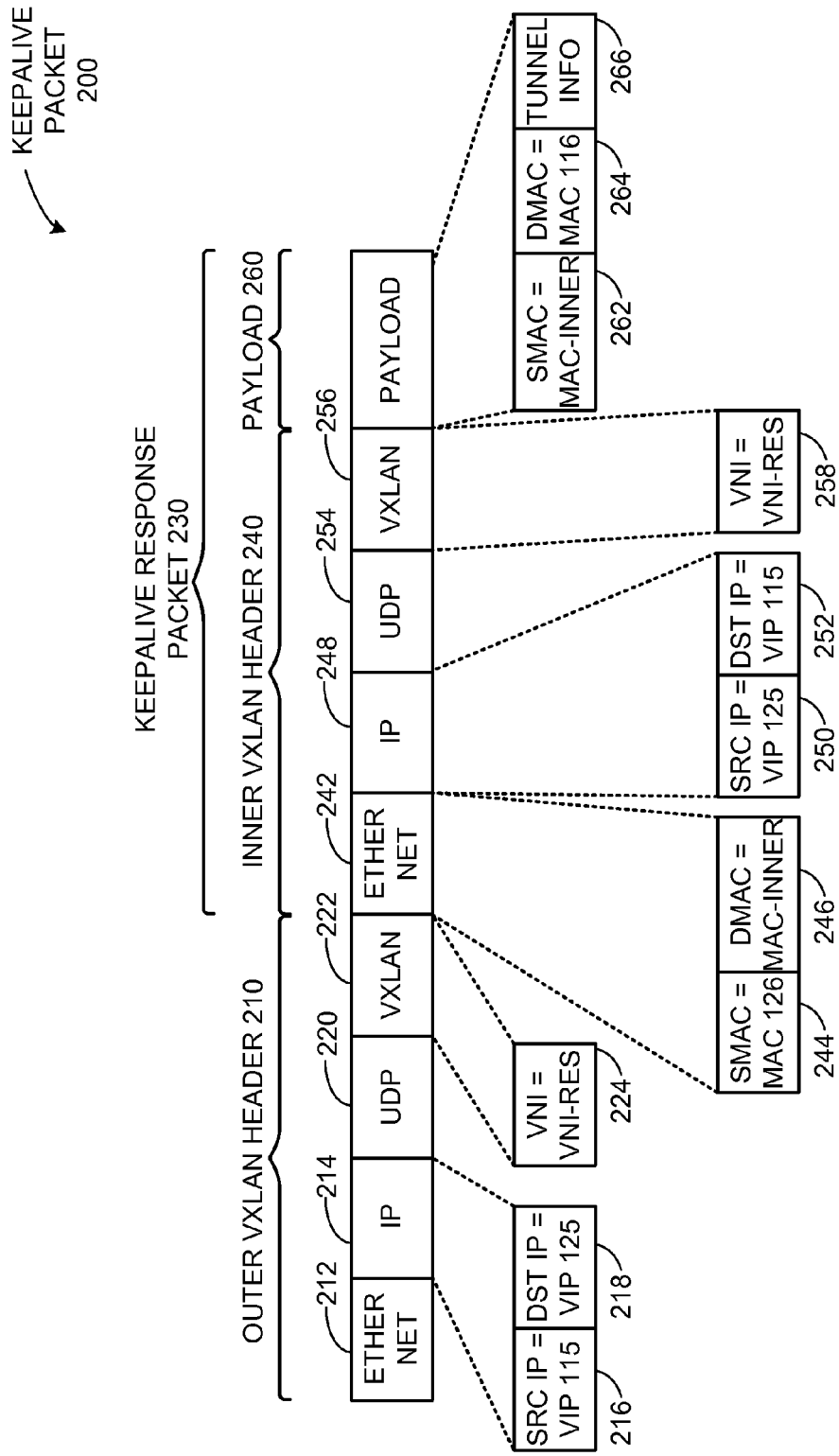
FIG. 2 illustrates an exemplary format of a keepalive packet, in accordance with an embodiment of the present invention.

FIG. 2 illustrates an exemplary format of a keepalive packet 200, in accordance with an embodiment of the present invention. Keepalive packet 200 includes, but is not limited to, the fields described herein. Keepalive packet 200 is a control packet that facilitates a source VTEP to determine whether a connection between the source VTEP and a destination VTEP is available (e.g., whether a VXLAN tunnel between the source VTEP and the destination VTEP is up). Keepalive packet 200 includes an outer VXLAN header 210, an inner VXLAN header 240, and a payload 260. Inner VXLAN header 240 and payload 260 form a keepalive response packet 230. Outer header 210 includes an Ethernet header 212, an IP header 214, a UDP header 220, and a VXLAN header 222. IP header 214 includes a source IP address 216 with a value set to the IP address of the source VTEP (e.g., virtual IP address 115 of fabric switch 110 as shown in FIG. 1B) and a destination IP address 218 with a value set to the IP address of the destination VTEP (e.g., virtual IP address 125 of fabric switch 120 as shown in FIG. 1B). VXLAN header 222 can include a VXLAN network identifier (VNI) 224 with a value set to "VNI-RES" which is programmed in both fabric switches 110 and 120 and used only for keepalive purposes. "VNI-RES" can be set by the system or can be configured by the user. In some embodiments, "VNI-RES" can be set to a value of "0" so that it does not collide with data VNIs.

Inner VXLAN header 240 includes an Ethernet header 242, an IP header 248, a UDP header 254, and a VXLAN header 256. Ethernet header 242 includes a source media access control (MAC) address 244 with a value set to the MAC address of the destination VTEP. Ethernet header 242 also includes a destination MAC address 246 with a value set to a preassigned and reserved MAC address, MAC-INNER, shared by all member switches in the fabric switch that includes the source VTEP. In some embodiments, source MAC address 244 is MAC address 126 of switch 121 and destination MAC address 246 is the reserved MAC (e.g., MAC-INNER). In some embodiments, member switches in both fabrics are programmed as a local MAC address (e.g., a MAC address assigned to the local switch).

IP header 248 can include a source IP address 250 with a value set to the IP address of the destination VTEP (e.g., virtual IP address 125 of fabric switch 120) and a destination IP address 252 with a value set to the IP address of the source VTEP (e.g., virtual IP address 115 of fabric switch 110). VXLAN header 256 includes a VXLAN network identifier (VNI) 258 with a value set to "VNI-RES," as described in relation to VNI field 224 of outer VXLAN header 210.

Payload 260 (e.g., keepalive response packet payload 192 of FIG. 1B) includes an Ethernet header that includes a source MAC address 262 with a value set to MAC-INNER and a destination MAC address 264 with a value set to MAC address 116 of the originating member switch 111. Payload 260 also includes a tunnel information field 266, which includes information that identifies the VXLAN tunnel to which keepalive packet 200 belongs. For example, tunnel information field 266 can be a cookie that includes a tunnel identifier, a timestamp, the RBridge identifier of the sender, etc. Payload 260 includes an Ethernet header (which includes source MAC address 262 and destination MAC address 264) and tunnel information 266. Note that tunnel information 266 is the payload portion of payload 260, where payload 260 is the payload of keepalive response packet 230 (e.g., keepalive response packet payload 192, as shown in FIGS. 1B and 1C). Furthermore, keepalive response packet 230 is the payload of keepalive packet 200. Thus, the Ethernet header of payload 260 can be viewed as a third header for the "payload" of tunnel information 266, where the first header is outer VXLAN header 210 and the second header is inner VXLAN header 240.

Sending a Keepalive Packet and Processing a Keepalive Response

Figure 3A:
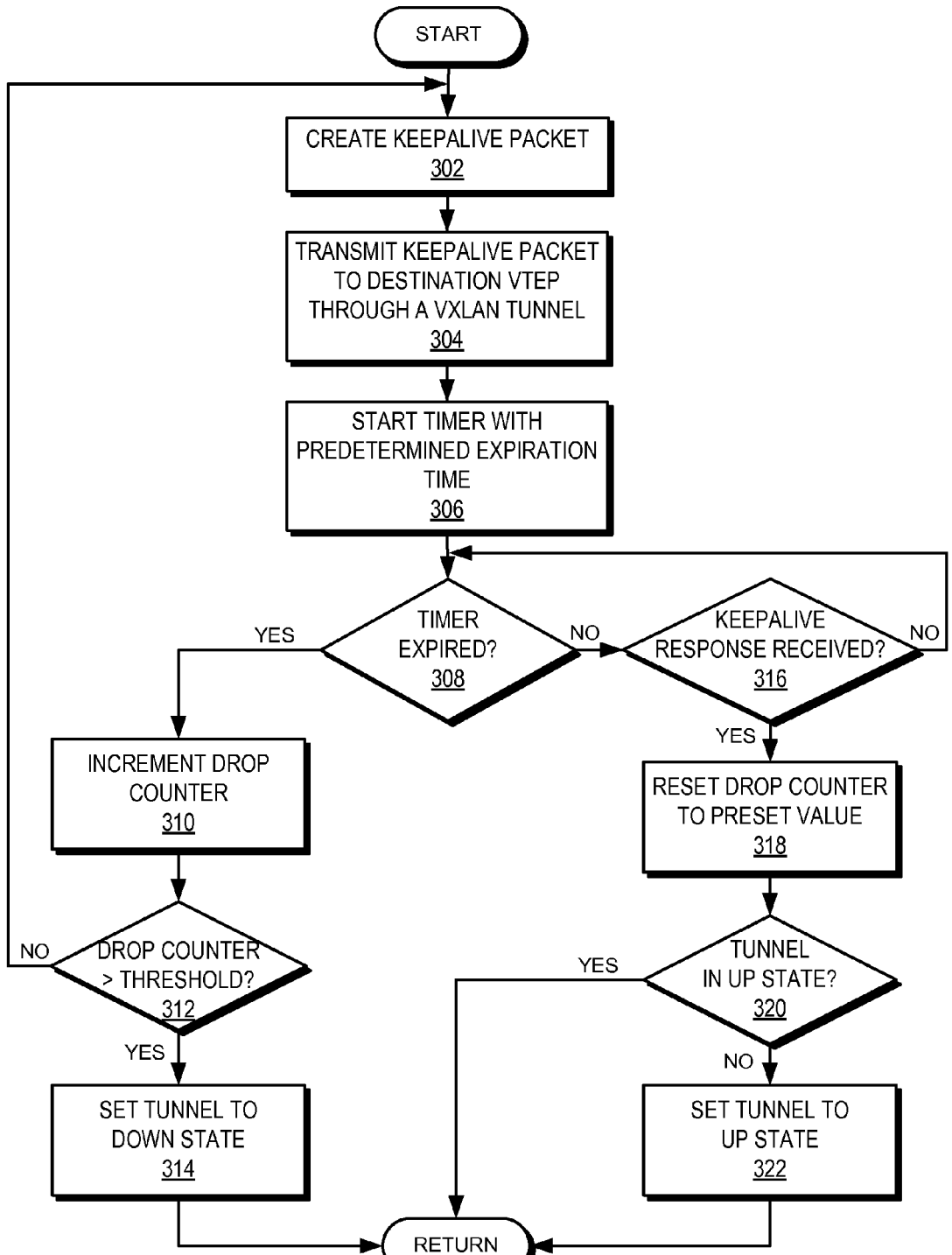
FIG. 3A presents a flowchart illustrating a process of a source VTEP, which is member switch of a fabric switch, monitoring the health of a VXLAN tunnel based on keepalive packets, in accordance with an embodiment of the present invention.

FIG. 3A presents a flowchart illustrating a process of a source VTEP, which is a member switch of a fabric switch, monitoring the health of a VXLAN tunnel based on keepalive packets, in accordance with an embodiment of the present invention. During operation, the switch creates a keepalive packet (operation 302). This switch can be the originating switch of the fabric switch. The switch transmits the keepalive packet to a destination VTEP (e.g., a remote switch) through a VXLAN tunnel (operation 304). The destination VTEP can be a standalone switch or member switch of a fabric switch. The originating member switch starts a timer that has a predetermined expiration time (operation 306). The switch checks whether the timer has expired (operation 308). If the timer has expired, the originating member switch increments a drop counter that has a predetermined threshold (operation 310). The switch then checks whether the drop counter has crossed the threshold (operation 312). If the drop counter has crossed the threshold, the switch sets the VXLAN tunnel to a down state (operation 314). If the drop counter has not crossed the threshold, the switch continues to send keepalive packets (operations 302, 304, and 306). If the timer has not expired, the switch determines whether a keepalive response has been received (operation 316). Operation 316 is further described in relation to FIG. 3B. If a keepalive response has not been received, the switch continues to check whether the timer has reached the predetermined expiration time (operation 308). If a keepalive response has been received, the originating member switch resets the drop counter (operation 318) and checks whether the VXLAN tunnel is in an up state (operation 320). In some embodiments, the drop counter can be reset to a value of "0" or "1." If the VXLAN tunnel is not in an up state (e.g., is in a down state), the originating member switch sets the VXLAN tunnel to an up state (operation 322).

Figure 3B:
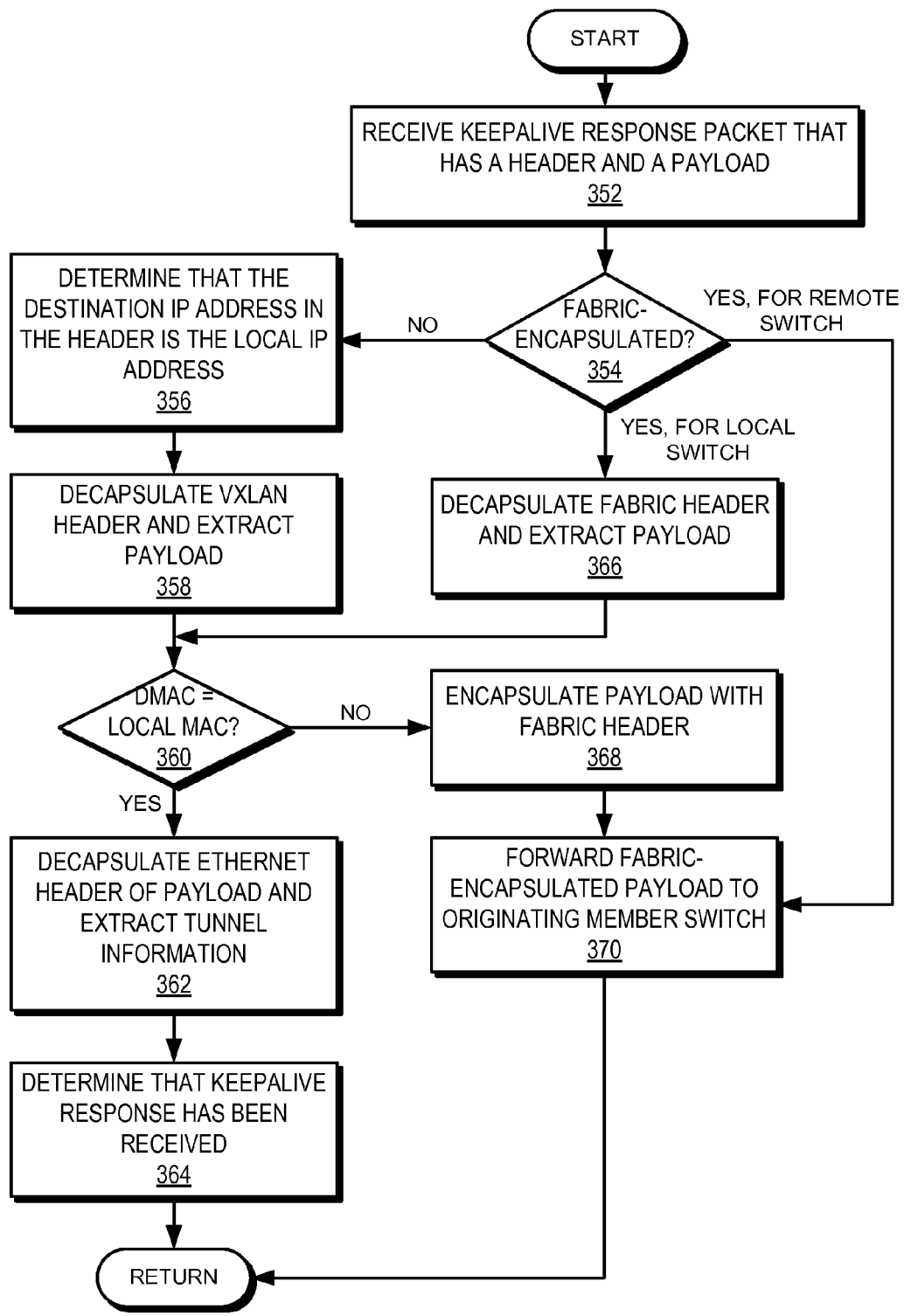
FIG. 3B presents a flowchart illustrating a process of a member switch of a fabric switch determining whether a keepalive response has been received, in accordance with an embodiment of the present invention.

FIG. 3B presents a flowchart illustrating a process of a member switch of a fabric switch determining whether a keepalive response has been received, in accordance with an embodiment of the present invention. During operation, the switch receives a keepalive response packet that has a header and a payload (operation 352). The switch then checks whether the packet is fabric-encapsulated (e.g., has a fabric header, as in intra-fabric keepalive response packet 188 of FIG. 1B) (operation 354). If the packet is fabric-encapsulated and the packet is destined for the local switch, the switch decapsulates the fabric header and extracts the payload (operation 356). The payload is, for example, keepalive response packet payload 192 as shown in FIGS. 1B and 1C. If the packet is fabric-encapsulated and the packet is not destined for the local switch, the switch forwards the fabric-encapsulated packet to the originating switch (operation 370). If the packet is not fabric-encapsulated (e.g., does not have a fabric header, as in keepalive response packet 184 of FIG. 1C), the switch determines that the destination IP address in the header (e.g., inner VXLAN header of keepalive response packet 184) is the local IP address (operation 356). The switch can also determine that the destination MAC address in the header is the local MAC address. For example, the member switch determines that destination IP address 252 of inner VXLAN header 240 as shown in FIG. 2 is the same as the local IP address of the switch (e.g., virtual IP address 115 of fabric switch 110), and also that destination MAC address 246 of inner VXLAN header 240 is the same as the local MAC address of the switch (e.g., MAC-INNER of fabric switch 110). The member switch decapsulates the VXLAN header (e.g., inner VXLAN header of keepalive response packet 184) and extracts the payload (e.g., payload 260, which corresponds to keepalive response packet payload 192 of FIG. 1B) (operation 358).

The member switch then determines whether the destination MAC address of the Ethernet header of the payload (e.g., destination MAC address 264 of payload 260 as shown in FIG. 2) matches the local MAC address of the switch (e.g., MAC address 116 of switch 111) (operation 360). If they match, the switch decapsulates the Ethernet header of the payload and extracts the tunnel information (e.g., tunnel information 266 of payload 260). The switch subsequently determines that a keepalive response has been received based on the tunnel information (operation 364).

In some embodiments, when the switch determines the destination MAC address to be the local MAC address, the tunnel information is processed by the software of the switch. The tunnel information included in the payload can be extracted by the software, which can modify a keepalive timestamp for a VXLAN tunnel to record the latest received keepalive response. Processing the keepalive response can also be offloaded to the switch hardware by maintaining a per tunnel access control list (ACL) with a counter, thereby allowing the software to poll a respective tunnel counter to determine whether a keepalive response has been received.

If the destination MAC in the payload does not match the local MAC address (operation 360), the switch encapsulates the payload with a fabric header (operation 368). The switch forwards the fabric-encapsulated payload to the originating member switch based on an intra-fabric forwarding protocol (operation 370), thereby allowing the originating member switch to receive the intra-fabric keepalive response packet and subsequently determine whether it has received a keepalive response. In some embodiments, the fabric header can be a TRILL header or an IP header. For example, the switch can create a TRILL header and set the egress identifier of the TRILL header as the switch identifier of the originating switch (e.g., based on the destination MAC address of the payload). The switch can determine an output port by looking up the next hop information for the switch identifier, and send the TRILL-encapsulated payload via the determined output port.

Receiving and Processing a Keepalive Packet

Figure 3C:
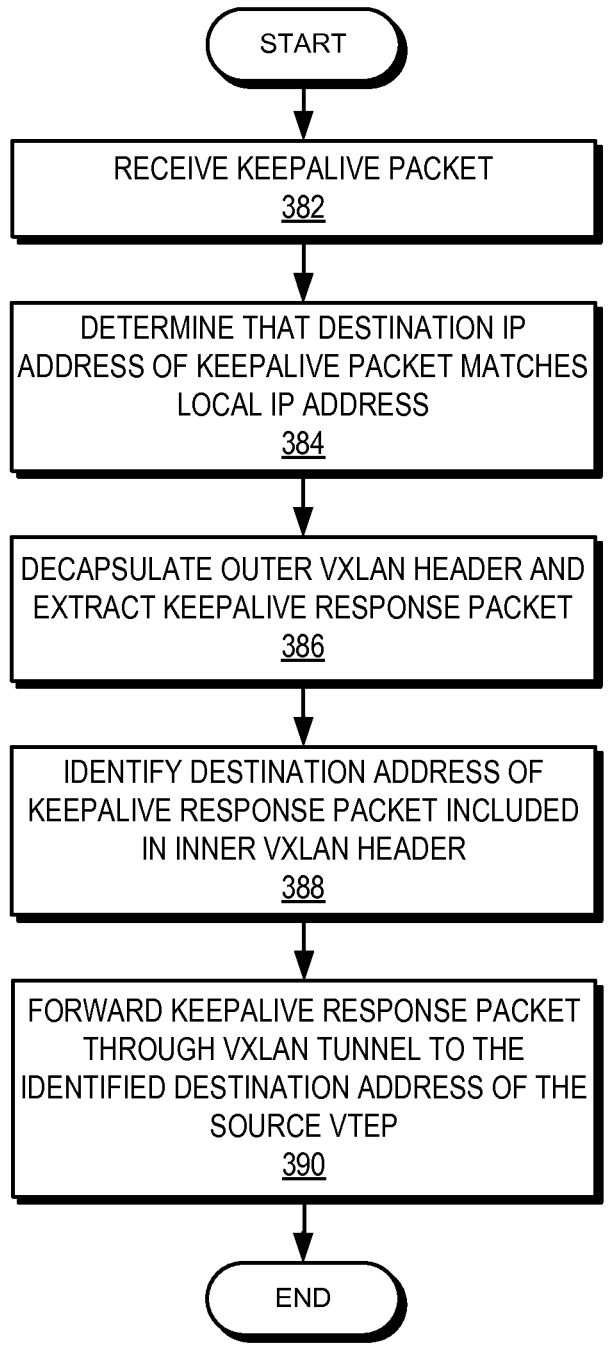
FIG. 3C presents a flowchart illustrating a process of a destination VTEP processing a keepalive packet, in accordance with an embodiment of the present invention.

FIG. 3C presents a flowchart illustrating a process of a destination VTEP processing a keepalive packet, in accordance with an embodiment of the present invention. During operation, a destination VTEP (e.g., switch 121 of fabric switch 120 of FIG. 1B) receives a keepalive packet (operation 382). The destination VTEP can be a member switch of a fabric switch or a standalone switch. The destination VTEP determines that the destination IP address in the outer VXLAN header of the keepalive packet (e.g., destination IP address 218 of outer VXLAN header 210 as shown in FIG. 2) matches the local IP address of the destination VTEP (e.g., virtual IP address 125 of fabric switch 120) (operation 384). The destination VTEP decapsulates the outer VXLAN header and extracts the keepalive response packet (operation 386). The keepalive response packet includes the inner VXLAN header and the payload, as shown in keepalive response packet 184 in FIGS. 1B and 1C. The destination VTEP processes the keepalive response packet like a standard VXLAN frame. The destination VTEP identifies the destination address of the source VTEP included in the inner VXLAN header (operation 388) and forwards the keepalive response packet via the VXLAN tunnel to the identified destination address for the source VTEP (operation 390).

VXLAN Tunnel Keepalives in a Non-Fabric Switch

Figure 4:
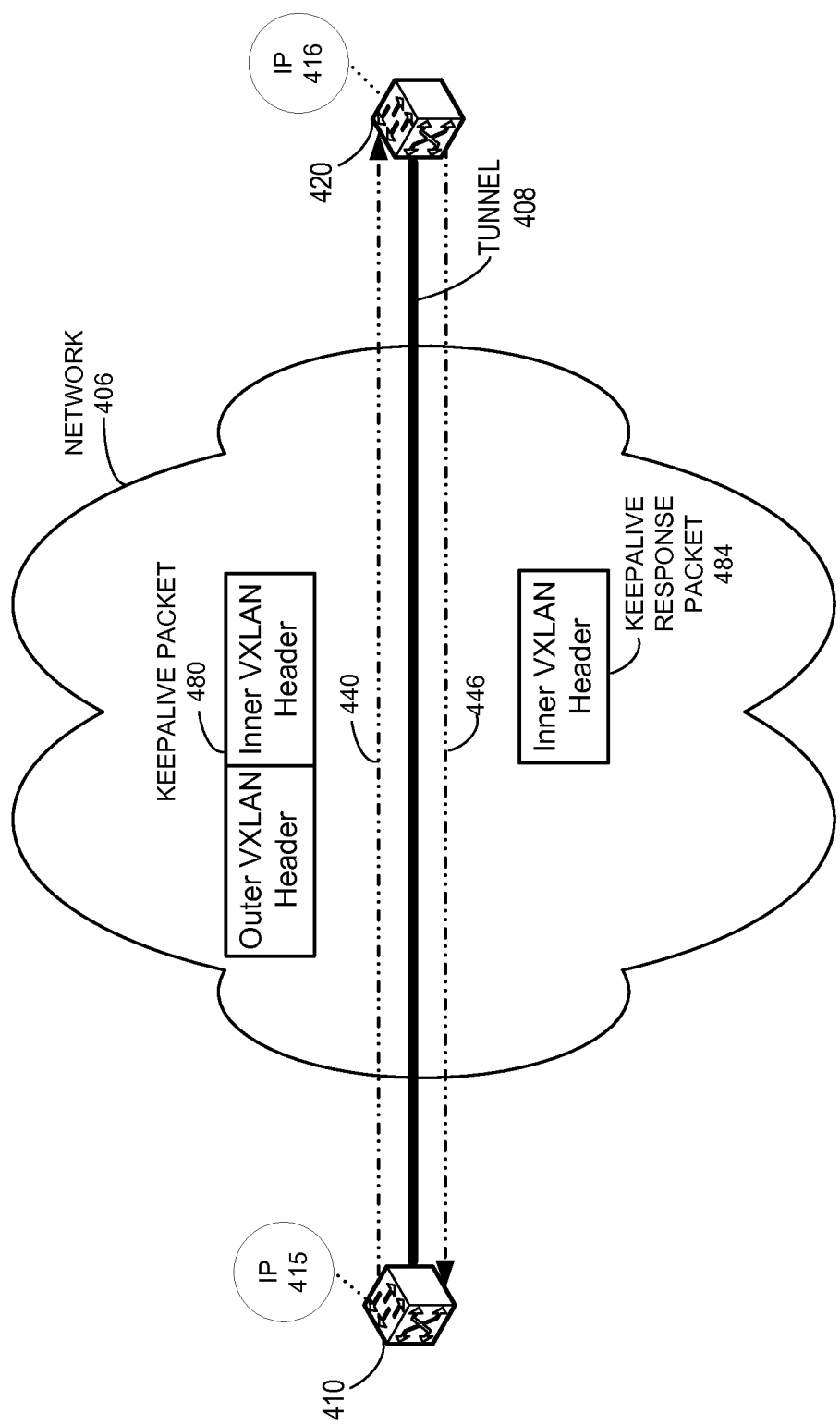
FIG. 4 illustrates an exemplary network that includes a VTEP, which is a standalone switch, capable of monitoring the health of a VXLAN tunnel based on keepalive packets, in accordance with an embodiment of the present invention.

FIG. 4 illustrates an exemplary network 400 that includes a VTEP, which is a standalone switch, capable of monitoring the health of a VXLAN tunnel based on keepalive packets, in accordance with an embodiment of the present invention. Network 400 can include a switch 410, a switch 420, and a virtual tunnel 408 between switch 410 and switch 420 passing through a network 406. Network 406 can be a layer-3 network (e.g., an IP network). Network 406 can couple switch 410 and/or switch 420 via a virtual link aggregation group (vLAG), as specified in U.S. Pat. No. 8,665,886, titled "Redundant Host Connection in a Routed Network," which is incorporated by reference herein. Switches 410 and 420 can each act as a virtual VXLAN tunnel endpoint in a VXLAN-based communication. An IP address can be associated with a respective switch. For example, switch 410 can have an IP address 415 and switch 420 can have an IP address 416. While switch 420 is depicted as a standalone switch in FIG. 4, switch 420 can also be a fabric switch.

A source VTEP can monitor the health of virtual VXLAN tunnel by sending a keepalive packet to a destination VTEP and tracking keepalive response packets received from the destination VTEP. During operation, the source VTEP (e.g., switch 410) creates and sends a keepalive packet 480 to the destination VTEP (e.g., switch 420) via flow 440. Keepalive packet 480 includes an outer VXLAN header and an inner VXLAN header, as described below in conjunction with FIG. 5. Switch 420, which is the destination VTEP, receives keepalive packet 480, decapsulates the outer VXLAN header, and transmits the decapsulated packet (e.g., keepalive response packet 484) back to switch 410, which is the source VTEP, via flow 446. Keepalive response packet 484 includes the inner VXLAN header. Based on a VXLAN network identifier (VNI) included in the inner VXLAN header and set to a value that indicates a keepalive response, switch 410 determines that the packet is a keepalive response packet and takes the appropriate action to monitor the health of the VXLAN tunnel, as described below in relation to FIG. 6A.

Figure 5:
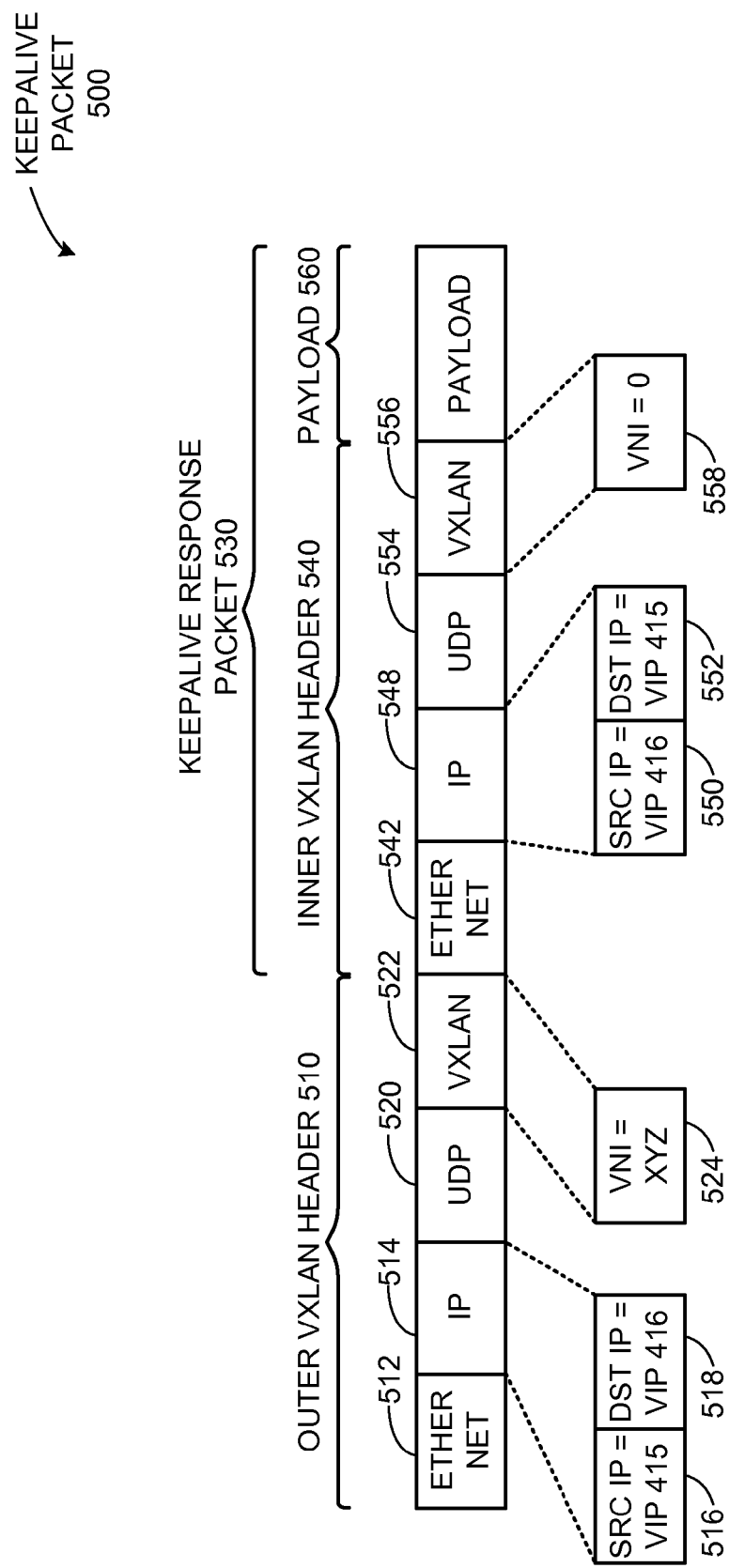
FIG. 5 illustrates an exemplary format of a keepalive packet, in conjunction with the network of FIG. 4, in accordance with an embodiment of the present invention.

FIG. 5 illustrates an exemplary format of a keepalive packet 500, in conjunction with the network of FIG. 4, in accordance with an embodiment of the present invention. Keepalive packet 500 includes, but is not limited to, the fields described herein. Keepalive packet 500 includes an outer VXLAN header 510, an inner VXLAN header 540, and an optional payload 560. Inner VXLAN header 540 (along with payload 560, if included) comprises a keepalive response packet 530. Outer header 510 includes an Ethernet header 512, an IP header 514, a UDP header 520, and a VXLAN header 522. IP header 514 includes a source IP address 516 with a value set to the IP address of the source VTEP (e.g., IP 415 of switch 410) and a destination IP address 518 with a value set to the IP address of the destination VTEP (e.g., IP 416 of switch 420). VXLAN header 522 can include a VXLAN network identifier (VNI) 524 with a value set to "XYZ" which can be a data VNI provisioned between the source VTEP and the destination VTEP. The value of "XYZ" can also be any reserved VNI that an application may choose to use only for keepalive purposes.

Inner VXLAN header 540 includes an Ethernet header 542, an IP header 548, a UDP header 554, and a VXLAN header 556. IP header 548 can include a source IP address 550 with a value set to the IP address of the destination VTEP (e.g., IP 416 of switch 420) and a destination IP address 552 with a value set to the IP address of the source VTEP (e.g., IP 415 of switch 410). VXLAN header 556 includes a VXLAN network identifier (VNI) 558 with a value set to a VNI reserved for keepalive purposes. In some embodiments, the value of VNI 558 is set to "0".

Figure 6A:
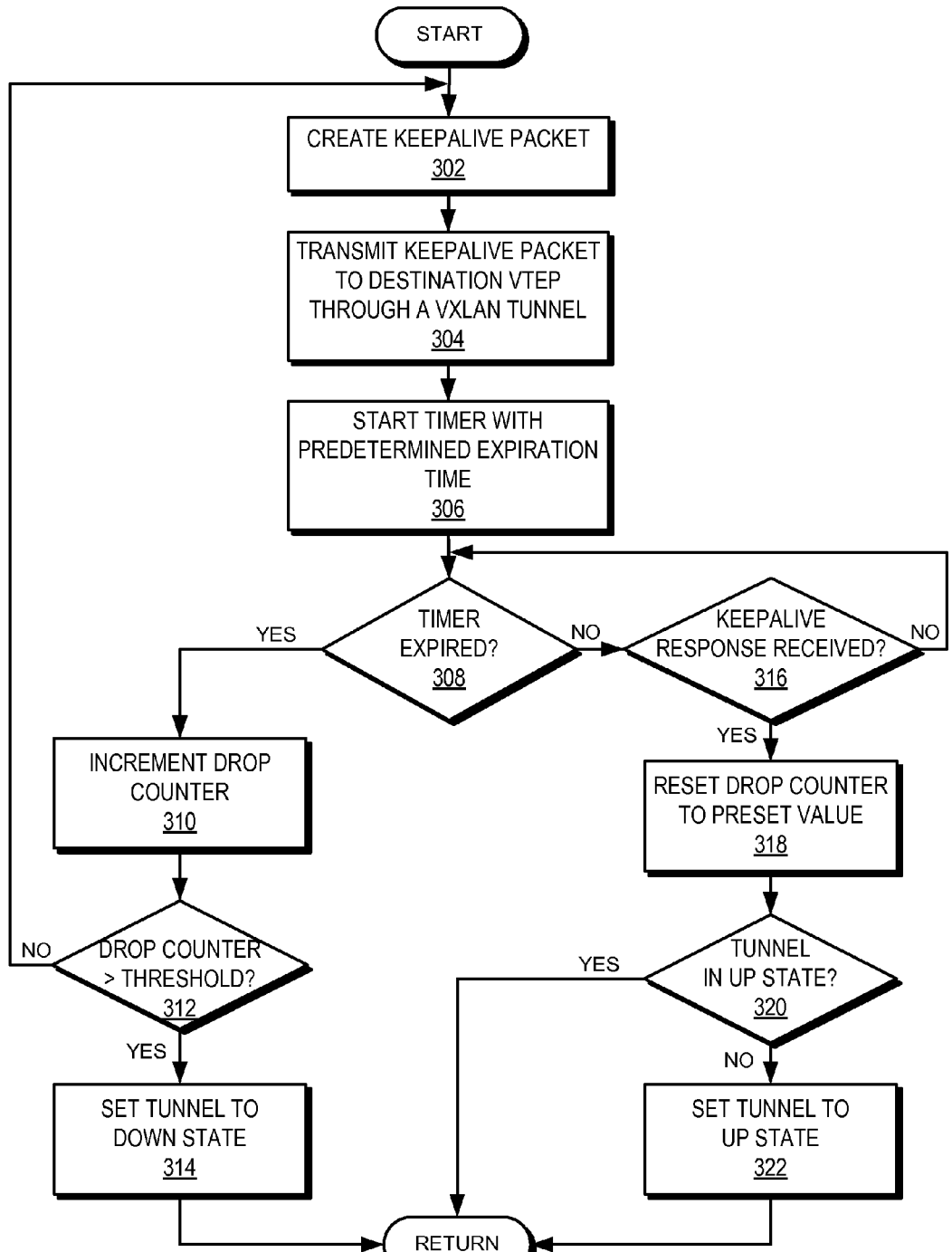
FIG. 6A presents a flowchart illustrating a process of a VTEP, which is a standalone switch, monitoring the health of a VXLAN tunnel based on keepalive packets, in conjunction with the network of FIG. 4, in accordance with an embodiment of the present invention.

FIG. 6A presents a flowchart illustrating a process of a VTEP, which is a standalone switch, monitoring the health of a VXLAN tunnel based on keepalive packets, in conjunction with the network of FIG. 4, in accordance with an embodiment of the present invention. During operation, a source VTEP creates a keepalive packet (operation 602) and transmits the keepalive packet to a destination VTEP through a VXLAN tunnel (operation 604). The destination VTEP can be a standalone switch or member switch of a fabric switch. The source VTEP starts a timer that has a predetermined expiration time (operation 606). The switch checks whether the timer has expired (operation 608). If the timer has expired, the source VTEP increments a drop counter that has a predetermined maximum threshold (operation 610). The switch then checks whether the drop counter has crossed the predetermined threshold (operation 612). If the drop counter has crossed the threshold, the source VTEP sets the VXLAN tunnel to a down state (operation 614). If the drop counter has not crossed the threshold, the source VTEP continues to send keepalive packets (operations 602, 604, and 606). If the timer has not expired, the source VTEP determines whether a keepalive response has been received (operation 616). Operation 616 is further described in relation to FIG. 6B. If a keepalive response has not been received, the source VTEP continues to check whether the timer has reached the predetermined expiration time (operation 608). If a keepalive response has been received, the source VTEP resets the drop counter (operation 618) and checks whether the VXLAN tunnel is in an up state (operation 620). In some embodiments, the drop counter can be reset to a value of "0" or "1." If the VXLAN tunnel is not in an up state (e.g., is in a down state), the source VTEP sets the VXLAN tunnel to an up state (operation 622).

Figure 6B:
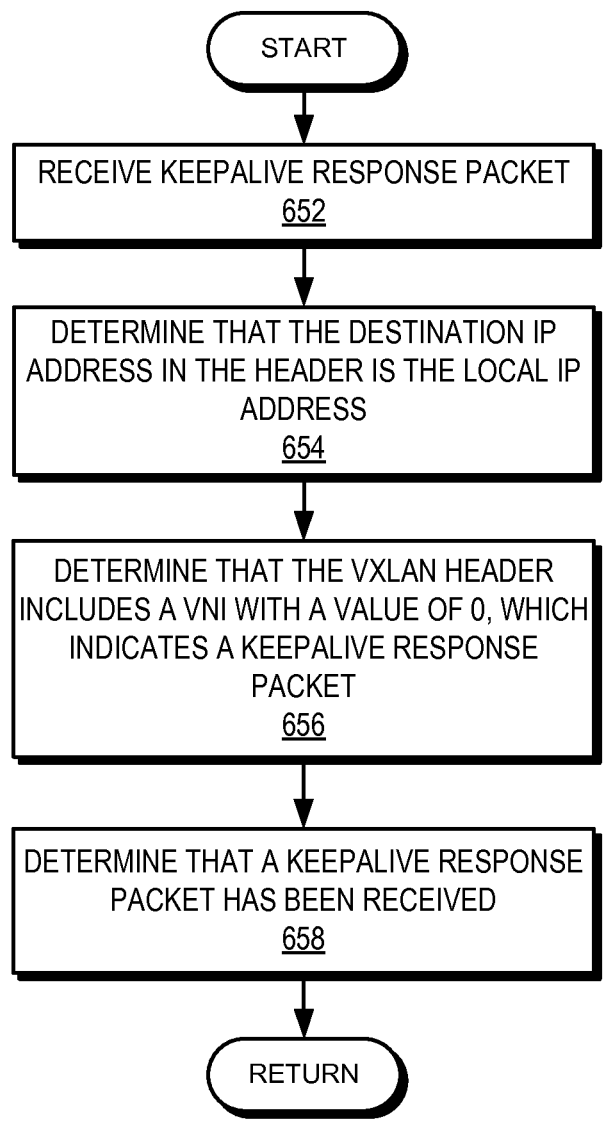
FIG. 6B presents a flowchart illustrating a process of a VTEP, which is a standalone switch, determining whether a keepalive response has been received, in accordance with an embodiment of the present invention.

FIG. 6B presents a flowchart illustrating a process of a VTEP, which is a standalone switch, determining whether a keepalive response has been received, in accordance with an embodiment of the present invention. During operation, the source VTEP receives a keepalive response packet (e.g., keepalive response packet 484 of FIG. 4) (operation 652). The source VTEP determines that the destination IP address in the header of the keepalive response packet is the same as the local IP address (operation 654). The source VTEP determines that the VXLAN header includes a VNI that indicates a keepalive response (operation 656). The source VTEP subsequently determines that a keepalive response packet has been received (operation 658).

Exemplary Switch

Figure 7:
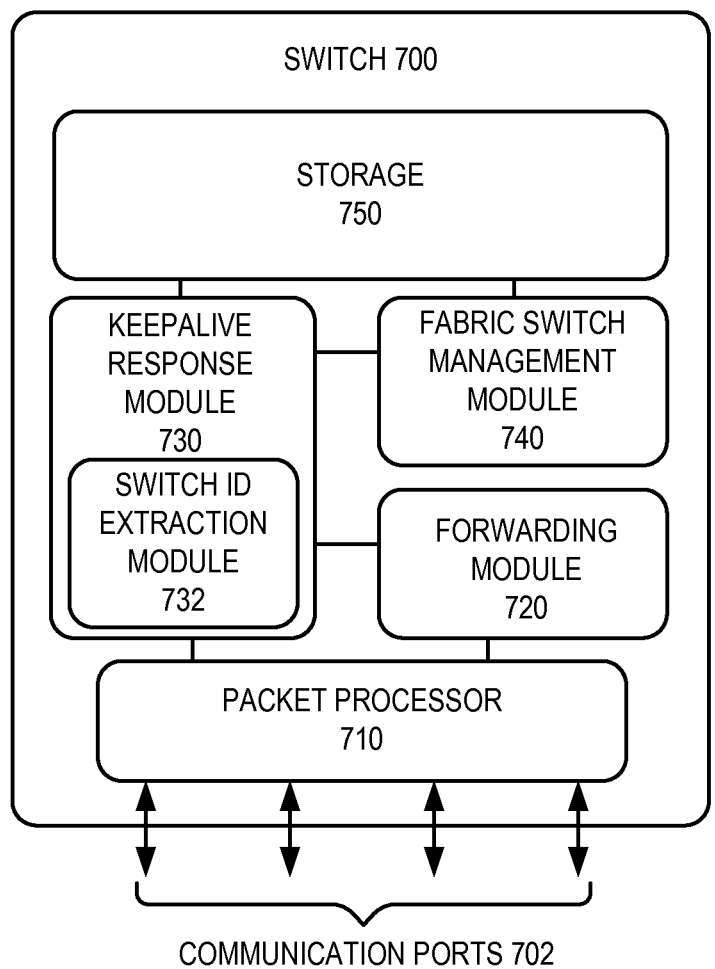
FIG. 7 illustrates an exemplary switch that monitors the health of a VXLAN tunnel based on keepalive packets, in accordance with an embodiment of the present invention.

FIG. 7 illustrates an exemplary switch capable of monitoring the health of a VXLAN tunnel based on keepalive packets, in accordance with an embodiment of the present invention. In this example, a switch 700 includes a number of communication ports 702, a forwarding module 720, a keepalive response module 730, a switch identifier extraction module 732, a packet processor 710 coupled to keepalive response module 730, and a storage 750. In some embodiments, switch 700 may maintain a membership in a fabric switch, wherein switch 700 also includes a fabric switch management module 760. Fabric switch management module 760 maintains a configuration database in storage 750 that maintains the configuration state of a respective switch within the fabric switch. Fabric switch management module 760 maintains the state of the fabric switch, which is used to join other switches. Under such a scenario, communication ports 702 can include inter-switch communication channels for communication within a fabric switch. This inter-switch communication channel can be implemented via a regular communication port and based on any open or proprietary format.

During operation, keepalive response module 730 operates to receive a keepalive response packet via one of communication ports 702. Communication ports 702 are adapted to receive packets encapsulated based on a first protocol. In some embodiments, the first protocol is based on a virtual extensible local area network (VXLAN). Keepalive response module 730 further operates to determine whether the keepalive response packet corresponds to any keepalive packet previously transmitted by switch 700. Switch 700 can be a member switch of a fabric switch.

Switch identifier extraction module 732 is adapted to extract a switch identifier from a payload of the keepalive response packet, where the switch identifier can correspond to another member switch in the fabric switch. Forwarding module 720 is adapted to construct a packet that includes a payload of a keepalive response packet, where the constructed packet is destined to the other member switch (corresponding to the extracted switch identifier). In some embodiments, packet processor 710 constructs the keepalive packet. Forwarding module 720 is further adapted to encapsulate the payload based on a second protocol, determine an output port for the encapsulated payload based on the extracted switch identifier, and transmit the encapsulated payload via the determined output port. Fabric switch management module 740 is adapted to determine a same reserved address for the switch and any member switch in the fabric switch.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

In summary, embodiments of the present invention provide a switch, method, and computer system for monitoring the health of a VXLAN tunnel. In one embodiment, the switch includes a keepalive response module, a switch identifier extraction module, and a forwarding module. During operation, the keepalive response module identifies a keepalive response packet that does not correspond to any keepalive packet previously transmitted by the switch. The switch identifier module extracts a switch identifier from a payload of the keepalive response packet, where the switch identifier corresponds to another member switch in the fabric switch. The forwarding module constructs a packet that includes the payload and is destined to the other member switch. In this way, the switch facilitates the other switch to monitor the health of a VXLAN tunnel based on keepalive packets.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch in a network of interconnected switches, comprising:
   one or more ports;
   keepalive response circuitry configured to decapsulate a first encapsulation header encapsulating a keepalive response packet, wherein a destination identifier of the first encapsulation header corresponds to the switch, and wherein the keepalive response packet indicates whether a tunnel is active;
   switch identifier extraction circuitry configured to extract a switch identifier from the keepalive response packet, wherein the switch identifier corresponds to a second switch in the network of interconnected switches, wherein the network of interconnected switches is identified by a fabric identifier; and
   forwarding circuitry configured to encapsulate the keepalive response with a second encapsulation header, wherein a destination identifier of the second encapsulation header corresponds to the second switch.

2. The switch of claim 1, wherein the first encapsulation header is based on a virtual extensible local area network (VXLAN).

3. The switch of claim 1, wherein the forwarding circuitry is further configured to:
   determine an output port for the encapsulated keepalive response packet based on the extracted switch identifier; and
   transmit the encapsulated keepalive response packet via the determined output port.

4. The switch of claim 1,
   wherein the second encapsulation header is based on one of:
   Transparent Interconnection of Lots of Links (TRILL); and
   Internet Protocol (IP).

5. The switch of claim 1, further comprising:
   fabric switch management circuitry adapted to determine a same reserved address for the switch and the second switch.

6. The switch of claim 1, wherein the keepalive response packet includes;
   information relating to the tunnel, which is between the switch and a remote switch.

7. The switch of claim 6, wherein the keepalive response packet further includes a network identifier that indicates a keepalive message and is set to one of:
   a reserved value;
   a value of 0;
   a value configured by a user; and
   a value that is provisioned between the switch and the remote switch.

8. The switch of claim 6, wherein the extracted switch identifier is a media access control (MAC) address that includes the destination identifier of the second encapsulation header in an encoded format.

9. A computer-implemented method, comprising:
   decapsulating, by a switch in a network of interconnected switches, a first encapsulation header encapsulating a keepalive response packet, wherein a destination identifier of the first encapsulation header corresponds to the switch, and wherein the keepalive response packet indicates whether a tunnel is active;
   extracting a switch identifier from the keepalive response packet, wherein the switch identifier corresponds to a second switch in the network of interconnected switches, wherein the network of interconnected switches is identified by a fabric identifier; and
   encapsulating the keepalive response packet with a second encapsulation header, wherein a destination identifier of the second encapsulation header corresponds to the second switch.

10. The method of claim 9, wherein the first encapsulation header is based on a virtual extensible local area network (VXLAN).

11. The method of claim 9, further comprising:
  determining an output port for the encapsulated keepalive response packet based on the extracted switch identifier; and
  transmitting the encapsulated keepalive response packet via the determined output port.

12. The method of claim 9,
  wherein the second encapsulation header is based on one of:
  Transparent Interconnection of Lots of Links (TRILL); and
  Internet Protocol (IP).

13. The method of claim 9, further comprising:
  determining a same reserved address for the switch and the second switch.

14. The method of claim 9, wherein the keepalive response packet includes
  information relating to the tunnel, which is between the switch and a remote switch.

15. The method of claim 14, wherein the keepalive response packet further includes a network identifier that indicates a keepalive message and is set to one of:
  a reserved value;
  a value of 0;
  a value configured by a user; and
  a value that is provisioned between the switch and the remote switch.

16. The method of claim 14, wherein the extracted switch identifier is a media access control (MAC) address that includes the destination identifier of the second encapsulation header in an encoded format.

17. A computer system for monitoring data flow, the system comprising:
  a processor; and
  a storage device coupled to the processor and storing instructions that when executed by a computer cause the computer to perform a method, the method comprising:
    decapsulating, by a switch in a network of interconnected switches, a first encapsulation header encapsulating a keepalive response packet, wherein a destination identifier of the first encapsulation header corresponds to the switch, and wherein the keepalive response packet indicates whether a tunnel is active;
    extracting a switch identifier from the keepalive response packet, wherein the switch identifier corresponds to a second switch in the network of interconnected switches, wherein the network of interconnected switches is identified by a fabric identifier; and
    encapsulating the keepalive response with a second encapsulation header, wherein a destination identifier of the second encapsulation header corresponds to the second switch.

18. The computer system of claim 17, wherein the first encapsulation header is based on a virtual extensible local area network (VXLAN).

19. The computer system of claim 17, wherein the method further comprises:
  determining an output port for the encapsulated keepalive response packet based on the extracted switch identifier; and
  transmitting the encapsulated keepalive response packet via the determined output port.

20. The computer system of claim 17,
  wherein the second encapsulation header is based on one of:
  Transparent Interconnection of Lots of Links (TRILL); and
  Internet Protocol (IP).

21. The computer system of claim 17, wherein the method further comprises:
  determining a same reserved address for the switch and the second switch.

22. The computer system of claim 17, wherein the keepalive response packet includes;
  information relating to the tunnel, which is between the switch and a remote switch.

23. The computer system of claim 22, wherein the keepalive response packet further includes a network identifier that indicates a keepalive message and is set to one of:
  a reserved value;
  a value of 0;
  a value configured by a user; and
  a value that is provisioned between the switch and the remote switch.

24. The computer system of claim 22, wherein the extracted switch identifier is a media access control (MAC) address that includes the destination identifier of the second encapsulation header in an encoded format.

* * * * *